(12) United States Patent
Lieffort et al.

(10) Patent No.: US 7,119,692 B2
(45) Date of Patent: Oct. 10, 2006

(54) SYSTEM FOR DETECTING RADIO-FREQUENCY IDENTIFICATION TAGS

(75) Inventors: Seth A. Lieffort, Eagan, MN (US); Edward D. Goff, Mahtomedi, MN (US); Ronald D. Jesme, Plymouth, MN (US); Thomas C. Mercer, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 22 days.

(21) Appl. No.: 10/705,677

(22) Filed: Nov. 10, 2003

(65) Prior Publication Data

US 2005/0099302 A1 May 12, 2005

(51) Int. Cl.
*G08B 13/14* (2006.01)
(52) U.S. Cl. ............... 340/572.4; 340/528; 340/539.1; 340/571; 340/572.7
(58) Field of Classification Search ............ 340/572.1, 340/568.1, 571–572.9
See application file for complete search history.

(56) References Cited

U.S. PATENT DOCUMENTS

| | | | |
|---|---|---|---|
| 4,281,321 A | | 7/1981 | Narlow et al. |
| 4,635,041 A | * | 1/1987 | Maimann et al. ........ 340/572.5 |
| 4,739,328 A | | 4/1988 | Koelle et al. |
| 4,864,158 A | | 9/1989 | Koelle et al. |
| 4,870,391 A | * | 9/1989 | Cooper .................... 340/572.5 |

(Continued)

FOREIGN PATENT DOCUMENTS

EP 0 435 198 7/1991

(Continued)

OTHER PUBLICATIONS

"Algorithm For RFID Security", filed Nov. 10, 2003, U.S. Appl. No. 10/705,733.

*Primary Examiner*—Benjamin C. Lee
*Assistant Examiner*—Son Tang
(74) *Attorney, Agent, or Firm*—Melissa E. Buss

(57) ABSTRACT

Techniques for detecting radio-frequency identification (RFID) tags are disclosed. For example, an exit control system is described that detects unauthorized removal of articles from a protected facility. A series of antennas are setup to produce interrogation corridors located near the exit of the protected area. RFID tags are attached to the articles to be protected. Each tag includes information that uniquely identifies the article to which it is affixed and status information as to whether the articles removal from the facility is authorized. The RF reader outputs RF signals through the antennas to create electromagnetic fields within the interrogation corridors. The reader outputs RF power from a single port to the multiple antennas via a splitter/combiner. In this way, a single RF reader with only one transmitter/receiver port simultaneously interrogates multiple antennas. A variety of techniques are described by which the reader can detect the removal of an unauthorized article.

17 Claims, 13 Drawing Sheets

U.S. PATENT DOCUMENTS

| | | | |
|---|---|---|---|
| 4,888,591 A | 12/1989 | Landt et al. | |
| 5,030,941 A * | 7/1991 | Lizzi et al. | 340/541 |
| 5,055,659 A | 10/1991 | Hendrick et al. | |
| 5,103,234 A | 4/1992 | Watkins et al. | |
| 5,126,749 A * | 6/1992 | Kaltner | 343/742 |
| 5,353,011 A | 10/1994 | Wheeler et al. | |
| 5,387,900 A * | 2/1995 | Plonsky et al. | 340/572.4 |
| 5,926,093 A | 7/1999 | Bowers et al. | |
| 6,020,856 A * | 2/2000 | Alicot | 343/742 |
| 6,037,879 A | 3/2000 | Tuttle | |
| 6,069,564 A * | 5/2000 | Hatano et al. | 340/572.7 |
| 6,094,173 A * | 7/2000 | Nylander | 343/742 |
| 6,104,333 A | 8/2000 | Wood, Jr. | |
| 6,335,686 B1 * | 1/2002 | Goff et al. | 340/572.4 |
| 6,396,341 B1 | 5/2002 | Pehlke | |
| 6,487,395 B1 * | 11/2002 | Durec et al. | 455/78 |
| 2004/0164864 A1 | 8/2004 | Chung et al. | |
| 2004/0201456 A1 | 10/2004 | Cole | |

FOREIGN PATENT DOCUMENTS

| | | |
|---|---|---|
| EP | 0 608 039 | 7/1994 |
| JP | 06076185 | 3/1994 |
| WO | WO 02/33511 | 4/2002 |
| WO | WO 03/040950 | 5/2003 |

* cited by examiner

SYSTEM FOR DETECTING RADIO-FREQUENCY IDENTIFICATION TAGS

TECHNICAL FIELD

The invention relates to the use of radio frequency identification systems for management of articles within a protected area and, more specifically, to techniques for detecting unauthorized removal of articles from a protected area.

BACKGROUND

Radio-Frequency Identification (RFID) technology has become widely used in virtually every industry, including transportation, manufacturing, waste management, postal tracking, airline baggage reconciliation, and highway toll management. RFID systems are often used to prevent unauthorized removal of articles from a protected area, such as a library or retail store.

An RFID system often includes an interrogation zone or corridor located near the exit of a protected area for detection of RFID tags attached to the articles to be protected. Each tag usually includes information that uniquely identifies the article to which it is affixed. The article may be a book, a manufactured item, a vehicle, an animal or individual, or virtually any other tangible article. Additional data as required by the particular application may also be provided for the article.

To detect a tag, the RF reader outputs RF signals through the antenna to create an electromagnetic field within the interrogation corridor. The field activates tags within the corridor. In turn, the tags produce a characteristic response. In particular, once activated, the tags communicate using a pre-defined protocol, allowing the RFID reader to receive the identifying information from one or more tags in the corridor. If the communication indicates that removal of an article has not been authorized, the RFID system initiates some appropriate security action, such as sounding an audible alarm, locking an exit gate, and the like.

Most methods of determining whether articles present in the interrogation corridor have been checked out depend upon first individually detecting and identifying each tag in the field, and then checking determining the status of the articles associated with the identified tags. Some methods, for example, involve determining a serial number for each tag, and then accessing a database to determine the status of the article associated with the identified serial number. Other techniques require issuing commands to the identified tags once the serial number has been determined.

This process can be time-consuming, especially if several tags exist in the field. For example, in order to obtain a complete tag serial number, only one tag can respond at a time. If more than one tag responds at a time, a collision occurs, the data received may be invalid, and neither tag's serial number can be obtained. To deal with this, some systems use an anti-collision process, which requires each tag to respond in a different time slot until all tags are heard. This added delay is undesirable in an exit control system because patrons are in the interrogation corridor for a very short period of time. Also, each patron can be carrying multiple books. The time required to determine whether every one of the books is checked-out is often much longer than the time a patron spends in the corridor.

SUMMARY

In general, the invention relates to a Radio-Frequency Identification (RFID) system for detecting radio-frequency identification tags. More specifically, the invention relates to an RF exit control system which detects unauthorized removal of articles from a protected facility, such as books or other articles from a library. A series of antennas are set up to produce interrogation corridors located near the exit of the protected area. RFID tags are attached to the articles to be protected. In one example system, each tag includes information that uniquely identifies the article to which it is affixed and status information as to whether the article is authorized to be removed from the facility. To detect a tag, the RF reader outputs RF signals through the antennas to create an electromagnetic field within the interrogation corridor. An RF reader outputs RF power from a single port to multiple antennas via a splitter/combiner. In this way, a single RF reader with only one transmitter/receiver port simultaneously interrogates multiple antennas. The field activates the tags, and the tags, in turn, produce a characteristic response. The RF reader receives the tag information via the single transmitter/receiver port and the RF exit control system determines whether removal of the article is authorized. If removal of the article is not authorized, the exit control system initiates some appropriate security action, such as sounding an audible alarm, locking an exit gate, etc.

In one embodiment of the invention, an exit control system includes a plurality of radio frequency (RF) antennas set up to provide one or more interrogation corridors and a RF reader coupled to the plurality of antennas, the RF reader having a transmitter/receiver (T/R) port that provides each of the antennas with RF power to produce interrogation fields within the interrogation corridor. The system may further include a splitter that receives the RF power from the RF reader and delivers the RF power to each of the plurality of antennas in the form of a plurality of antenna drive signals.

In another embodiment, a method comprises producing a radio frequency (RF) output signal from a single transmitter/receiver (T/R) port of an RF reader, splitting the RF output signal into a plurality of antenna drive signals, and delivering the antenna drive signals to a plurality of antennas to produce interrogation fields within one or more interrogation corridors. The method may further include generating one or more input signals with the antennas in response to at least one tag present within the interrogation fields, combining the input signals into a combined input signal, and providing the combined input signal to the T/R port of the RF reader.

In another embodiment, a computer-readable medium comprises instructions that cause a processor to receive from a single reader a tag detection signal that indicates at least one tag is present within any of a plurality of interrogation corridors, receive a patron signal that indicates at least one patron is present within any of the interrogation corridors, and output an alarm signal upon receiving the tag detection signal and the patron signal within a time period. The computer-readable medium may further comprise instructions to cause the processor to initiate a timer upon receiving either of the tag detection signal or the patron signal and output the alarm signal upon receiving the other one of the tag detection signal or the patron signal prior to expiration of the timer.

The details of one or more embodiments of the invention are set forth in the accompanying drawings and the description below. Other features, objects, and advantages of the invention will be apparent from the description and drawings, and from the claims.

DETAILED DESCRIPTION

In general, techniques are described herein for detecting Radio-Frequency Identification (RFID) tags. More specifically, this description is directed to techniques that utilize an RF exit control system to detect unauthorized removal of articles from a protected area. The protected area is generally of the type in which the removal of articles must be authorized, such as books in a library or items in a retail store. Each article in the facility contains an RFID tag, which may uniquely identify the article to which it is affixed. In addition, for purposes of the present description, the RFID tag also contains status information indicating whether removal of the article is authorized. The RFID tag may be embedded within the article so that the tag is substantially imperceptible, to help prevent tampering. An exit control system determines if removal of the article from the facility has been authorized (e.g., a book has been properly checked-out by a library patron or staff member) and sets off an alarm if it has not.

Figure 1:
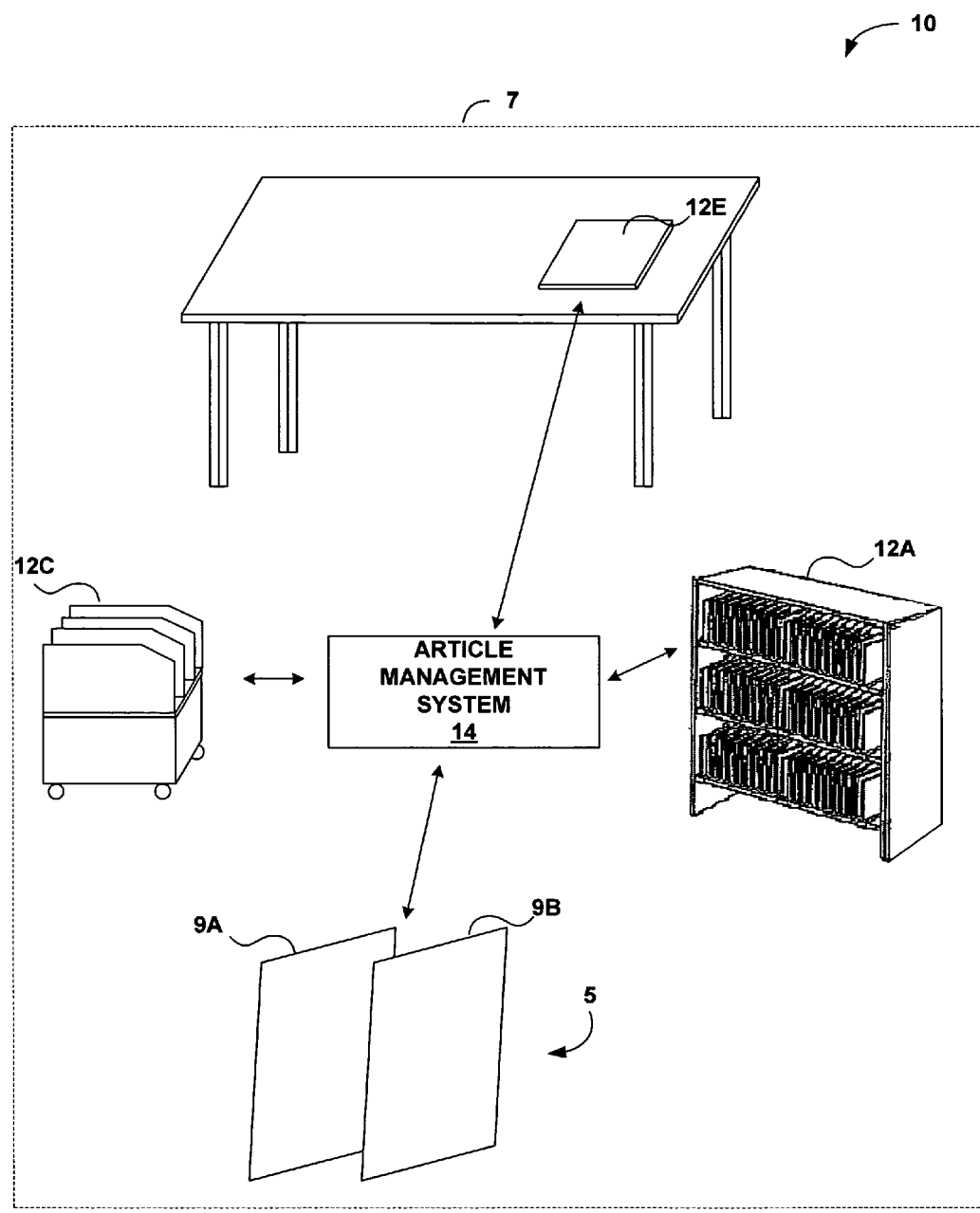
FIG. 1 is a block diagram illustrating a radio frequency identification (RFID) system for management of articles traveling into and out of a protected area.

FIG. 1 is a block diagram illustrating a radio frequency identification (RFID) system 10. Exit control system 5 detects unauthorized removal of articles from a protected area 7. For purposes of the present description, the protected area will be assumed to be a library and the articles will be assumed to be books or other articles to be checked out. Although the system will be described with respect to detecting checked-in tags to prevent their unauthorized removal from a facility, it shall be understood that the present invention is not limited in this respect, and that the techniques described herein are not dependent upon the particular application in which the RFID system is used. For example, the system could also be used to check for other kinds of status or type information without departing from the scope of the present invention.

Exit control system 5 includes lattices 9A and 9B which define an interrogation zone or corridor located near the exit of protected area 7. The lattices 9A and 9B include antennas for interrogating the RFID tags as they pass through the corridor to determine whether removal of the item to which the tag is attached is authorized. As described in further detail below, exit control system 5 utilizes a single reader to drive multiple antennas. To detect a tag, an RF reader outputs RF power through the antennas to create an electromagnetic field within the interrogation corridor. The RF reader outputs RF power from a single port to multiple antennas via a splitter/combiner. In this way, a single RF reader with only one transmitter/receiver port simultaneously interrogates the corridor using multiple antennas. The field activates the tags and the tags, in turn, produce a characteristic response. The RF reader receives the tag information via the single transmitter/receiver port and the exit control system determines whether removal of the article is authorized. If removal of the article is not authorized, the exit control system initiates some appropriate security action, such as sounding an audible alarm, locking an exit gate, etc.

In addition, the overall RFID system 10 may include a number of "smart storage areas" 12 within protected area 7. For example, an open shelf 12A, a smart cart 12C, a desktop reader 12E and other areas. Each smart storage area 12 includes tag interrogation capability which enables tracking of articles throughout a facility. In a library setting, for example, a book could be tracked after check-in while en route to a shelf 12A on a smart cart 12C.

The RFID tags themselves may take any number of forms without departing from the scope of the present invention. Examples of commercially available RFID tags include 3M™ RFID tags available from 3M Company, St. Paul, Minn., or "Tag-it" RFID transponders available from Texas Instruments, Dallas, Tex. An RFID tag typically includes an integrated circuit operatively connected to an antenna that receives RF energy from a source and backscatters RF energy in a manner well known in the art. The backscattered RF energy provides a signal that may be received by an interrogator within RFID system 10 to obtain information about the RFID tag, and its associated article.

An article management system 14 provides a centralized database of the tag information for each article in the facility. Article management system 14 may be networked or otherwise coupled to one or more computers so that individuals, such as a librarian, at various locations, can access data relative to those items. For example, a user may request the location and status of a particular article, such as a book. Article management system 14 may retrieve the article information from a database, and report to the user the last location at which the article was located within one of the smart storage areas. Optionally, the system can re-poll or otherwise re-acquire the current location of the article to verify that the article is in the location indicated in the database.

Figure 2:
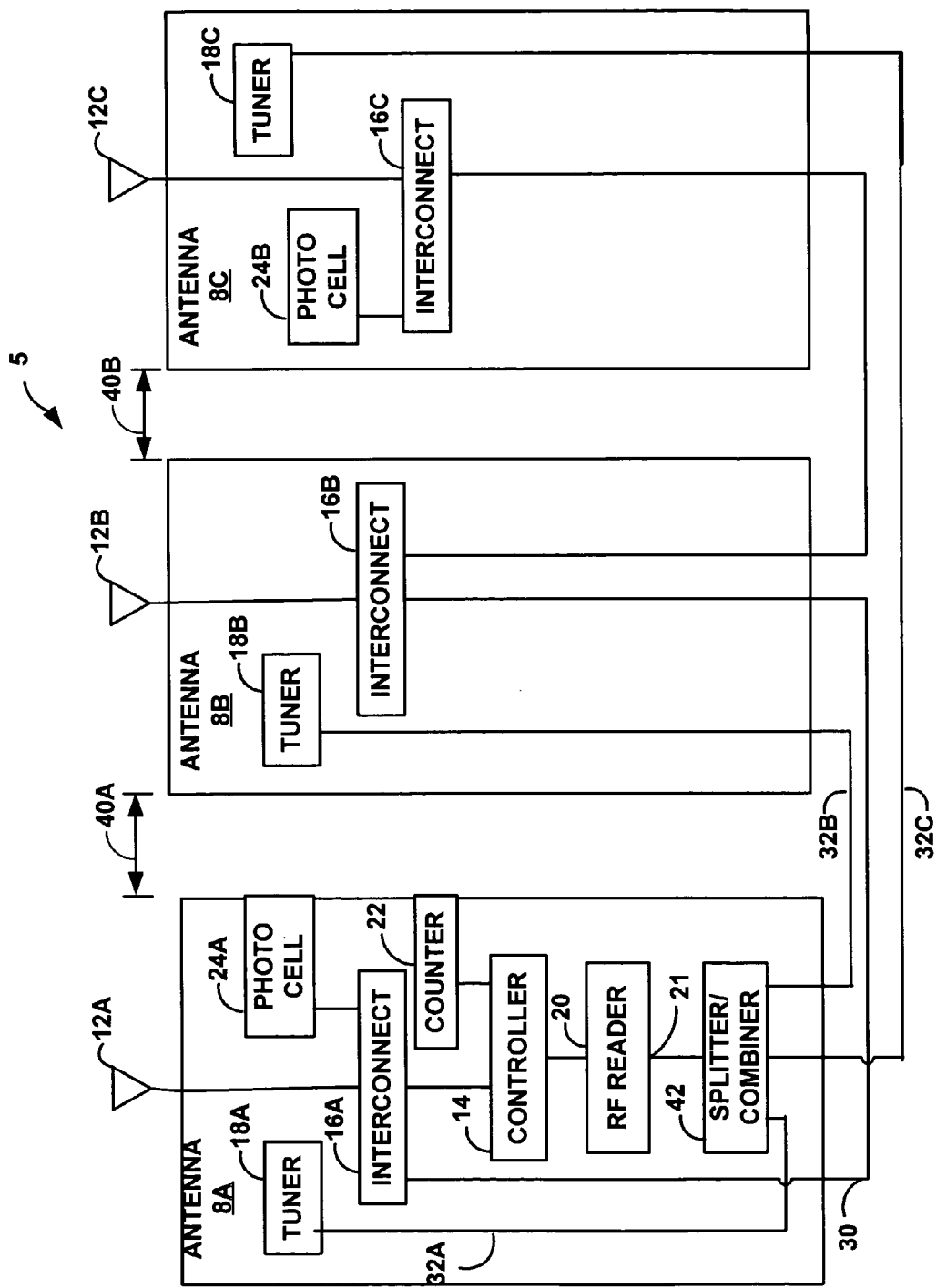
FIG. 2 is a more detailed block diagram of the RF exit control system.

FIG. 2 shows a more detailed block diagram of an example embodiment of the RFID exit control system 5. As illustrated, exit control system 5 is configured for transmitting and/or receiving data from one port of RF reader 20 to/from multiple antennas according to the techniques described herein.

More specifically, exit control system 5 includes antennas 8A, 8B and 8C (collectively referred to as "antennas 8") positioned to provide multiple interrogation zones 40A and 40B. Each antenna 8A–C includes an associated tuner 18A–C through which the antennas are connected to RF reader 20 and ultimately to controller 14. Although FIG. 2 shows system 10 as including three antennas 8A–8C and two interrogation zones 40A and 40B, it shall be understood that exit control system 5 can include any number of antennas set to provide any number of interrogation zones depending upon the needs of the facility.

Exit control system 5 operates within a frequency range of the electromagnetic spectrum, such as 13.56 MHz, with an allowable frequency variance of +/−7 kHz, which is often used for Industrial, Scientific and Medical (ISM) applications. However, other frequencies may be used for RFID applications, and the invention is not so limited.

Antennas 8 may be designed to develop electromagnetic fields of at least certain strengths within the interrogation corridors 40. This may be advantageous for one or more reasons, including improving the likelihood of detecting tags having the desired status, e.g., tags that are checked-in in a library application. In one embodiment, the electromagnetic fields created by the antennas 8 are used to power the RF tags in the corridors 40. The amount of energy induced in each RF tag is proportional to the strength of the magnetic field passing through the tag loop. The antennas 8 therefore may produce a field having a magnitude that exceeds a threshold magnitude for energizing an RF tag, such as 115 dBuA/m. In addition, the magnitude preferably meets or exceeds the threshold magnitude throughout a substantial volume of the interrogation corridor. For example, the field produced may have a magnitude that exceeds the threshold magnitude for 50%, 75%, 90%, 99%, or more of the volume of the interrogation corridor, thus increasing the likelihood that unauthorized (i.e., tags that are still checked-in) RF tags in the corridor are successfully detected.

The RF Reader 20 of exit control system 5 may also read/write data from/to the RFID tags. RF reader 20 outputs RF power from one transmitter/receiver port 21 to multiple antennas 8 via a splitter/combiner 42. In this way, one RF reader 20 with only one transmitter/receiver port 21 can simultaneously use multiple antennas to interrogate RF tags. In the embodiment shown in FIG. 2, the splitter/combiner 42 is external to RF reader 20 such that the system is easily scalable. Thus, to accommodate a different number of interrogating antennas, only the splitter/combiner 42 need be changed.

RF reader 20 receives a response from the RFID tags through the same splitter/combiner 42 and transmitter/receiver port 21. The received signal is analyzed by the system to determine whether a checked-in (e.g., not checked out) article is present in an interrogation corridor 40.

By providing RF power to each antenna with RF reader 20, each antenna 8 receives RF power and none of the antennas 8 need rely on electromagnetic coupling to a driven antenna to get power. This greatly improves the detection capability of the exit control system 5 under conditions where electromagnetic coupling is inadequate, such as when the antennas are not large enough or close enough together to allow efficient coupling.

Because RF reader 20 receives a response from the RFID tags through the same splitter/combiner 42, the return signal from any RF tags in the corridor are combined going back through the splitter/combiner 42 into the RF reader transmitter/receiver port 21. In this way, if a weak tag signal is received by antenna 8A and a weak signal for the same tag is also received by antenna 8B, for example, the two weak signals from antennas 8A and 8B are combined at splitter/combiner 42. The combined signal is then input into RF reader 20 through transmitter/receiver port 21. This greatly increases the likelihood detecting even weak tag signals.

In an example embodiment, the exit control system 5 detects only whether at least one checked-in tag is present in the corridor. There are several situations in which numerous tags could be present in the corridor. For example, one patron could be carrying multiple articles through the corridor. Alternatively, multiple patrons, each carrying at least one article, could pass through the same or different corridors simultaneously. Furthermore, because of the relatively short period of time it takes for a patron to pass through the corridor, there typically is not enough time to receive and analyze individual information for each and every tag that may be in the corridor. By combining the individual signals from each of the antennas in the system, the signal received by the RF reader will indicate simply whether at least one checked-in tag is present in the corridor. The present exit control system is thus designed such that even when numerous tags are present in the corridor, if at least one of them has checked-in status, the system will alarm. Similarly, when numerous tags are present in the corridor and more than one of them has checked-in status, the system will alarm. The librarian or other designated employee can then check the articles to determine which of the articles present when the system alarmed have not been properly checked-out. The methods by which the system may determine presence of a checked-in tag (i.e., one that has not been properly checked-out and is therefore not authorized to be removed from the facility) are described in further detail below with respect to FIGS. 7–14. Although the system is described with respect to detecting presence of checked-in tags to prevent their unauthorized removal from a facility, it shall be understood that the present invention is not limited in this respect. For example, the system could also be used to check for other kinds of status or type information without departing from the scope of the present invention.

Photocells 24A and 24B, one for each interrogation corridor 40A and 40B, respectively, signal presence of a patron in their respective corridors. Interconnects 16A, 16B and 16C connect the alarms 12 and photocells 24 to controller 14. A counter 22 may also be included which increments each time one of photocells 24 detect a patron in the corridor.

In one embodiment, each antenna 8 nominally receives the same amount of RF power from RF reader 20, but, as will be described in more detail below, is driven ninety degrees out of phase with its neighboring antennas. The phase shift, by creating a rotating field between antennas, enhances the ability of the system to detect tags regardless of the orientation of the tag. In this manner, the exit control system 5 transmits and receives from one RF reader transmitter/receiver port 21 to multiple antennas 8 via a splitter/combiner 42. Antennas 8 receive nominally the same amount of power from the RF reader, but are driven 90° out of phase with each other.

In one embodiment in which a response is received for a checked-in tag, the RF reader 20 communicates with the controller 14, which may enable alarms 12. In FIG. 2, alarms 12 include visual alarms 12A and 12C and audible alarm 12B, although any combination of visual, audible, or other method of communicating checked-in RF tag presence may be used.

Figure 3:
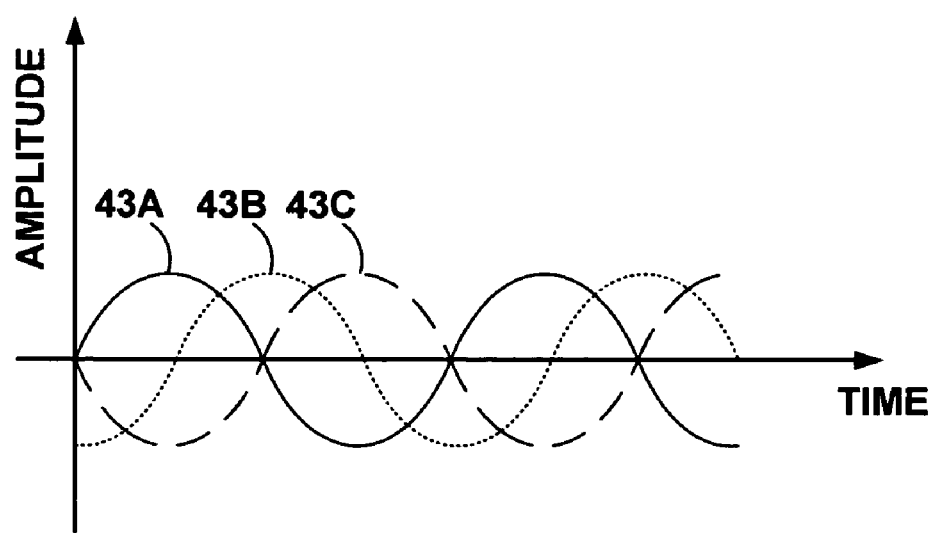
FIG. 3 is a graph showing the drive field signals for each of the antennas in a three-antenna RF exit control system.

FIG. 3 is a graph that shows the resulting phase shift of the RF drive signals 43A–C for each antenna 8A–8C (FIG. 2), respectively. As shown in FIG. 3, the RF drive signal 43B for antenna 8B is 90° out of phase with the RF drive signal 43A for antenna 8A; the RF drive signal 43C for antenna 8C is 180° out of phase with antenna 8A, etc.

The phase shift allows the system to detect RF tags in all orientations by creating a rotating field between the antennas. Thus, regardless of the orientation of the RF tag as it travels through the interrogation corridor, the likelihood of detection is increased.

Various methods can be used to achieve the 90° phase shift between neighboring antennas. In one embodiment, the antennas are connected using transmission lines that differ by ¼ wavelength between neighboring antennas to achieve the desired 90° phase shift. For example, referring again to FIG. 2, lines 32A, 32B and 32C which connect the antennas 8A, 8B and 8C to splitter/combiner 42 could be implemented by coupling lengths of ¼ wave transmission lines as appropriate to drive each successive antenna 90° out of phase as shown in FIG. 3.

In another embodiment, compensation circuitry could be provided at each antenna 8A–C to adjust the phase shift induced by transmission lines 32A–C such that the resulting phase shifts are 90° out of phase as shown in FIG. 3.

The exit control system 5 thus provides several advantages. One RF reader with only one transmit/receive port can be used to simultaneously utilize multiple antennas. By providing RF power to each antenna at a controlled amplitude and phase, magnetic coupling is not relied upon to deliver power to the antennas and to control the relative phase of each antenna. Also, because the interrogating fields are driven to produce a rotating interrogation field, coverage is increased in the interrogation corridor. In addition, the system is scalable—namely, the number of interrogating antennas to be utilized in any particular system can be accommodated by changing only the RF splitter. Weak signals from multiple antennas are combined to form an adequate signal, thus also increasing the likelihood of detecting signals. Moreover, EM emissions are reduced by driving the antennas at a 90° phase shift, as the far fields for any antennas driven 180° apart will cancel.

Figure 4:
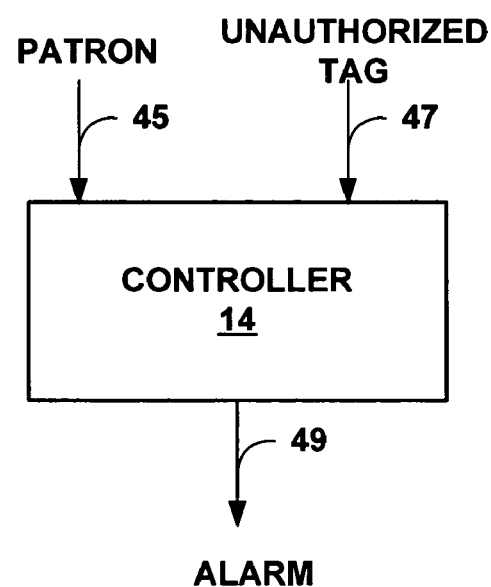
FIG. 4 is a block diagram that illustrates controller in further detail.

FIG. 4 is a block diagram that illustrates controller 14 in further detail. As illustrated, in the embodiment depicted in FIG. 2, controller 14 receives an input signal 45 from interconnect 16A that indicates a patron has been detected in corridors 40. In addition, controller 14 receives an input signal 47 from RF reader 20 that indicates that the RF reader has detected at least one signal within corridors 40. In an embodiment, as described in further detail below, controller 14 continually monitors input signals 45 and 47. When input signals 45 and 47 indicate that both a patron and a checked-in tag have been detected, controller 14 initiates an alarm.

Figure 5:
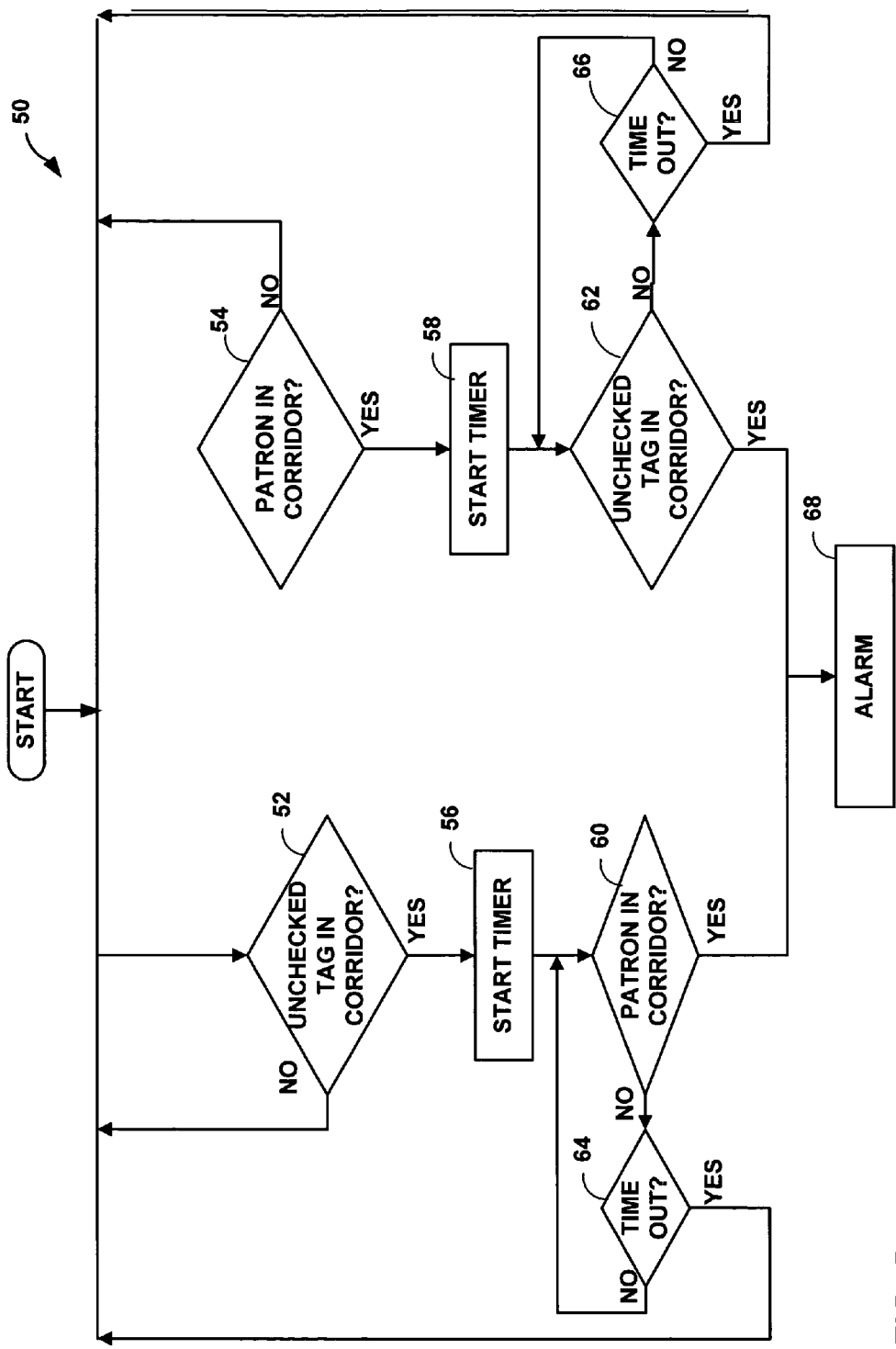
FIG. 5 is a flow chart illustrating the overall operation of the RF exit control system.

FIG. 5 is a flowchart 50 further illustrating exemplary operation of controller 14. As illustrated, controller 14 performs a continuous loop monitoring that looks for a checked-in tag in the corridor, or for a patron to enter the corridor, and initiates an alarm only when both a patron and a checked-in RF tag are detected in an interrogation corridor. Thus, controller 14 continually monitors input signals 45 and 47 to determine whether a checked-in RF tag (52) or a patron (54) is present in any of corridors 40A or 40B. If either one of these conditions is met, controller 14 starts a timer (56 or 58, respectively). The purpose of the timer is to ensure presence of both a patron and a checked-in RF tag in the corridor at essentially the same time, for example, within 0.5 seconds, or some other time as may be appropriate.

Controller 14 next determines whether the other criteria, namely either a patron (60) or a checked-in RF tag (62) is present. If not, controller 14 checks whether the timer has timed out (64 or 66, respectively). If so, then both a patron and a checked-in RF tag were not present within the allotted time frame, and controller 14 returns to the beginning of the loop. In the event that both a patron and a checked-in tag are present in the corridor within the allotted time frame, controller 14 activates the alarm (68).

Various techniques by which the exit control system determines whether an unauthorized tag is present in the corridor will now be described. In one embodiment, the techniques described herein allow RF reader 20 to quickly determine whether any articles that are not properly checked-out (in other words, articles that have checked-in status and are therefore not authorized to be removed from the facility) are in the interrogation corridor. The techniques allow RF reader 20 to rapidly and accurately determine the presence of articles with checked-in status in the corridor, and will minimizes the adverse impact of tag collisions that may otherwise degrade the system performance.

As described above, quickly determining the presence of a tag with checked-in status can be important because of the relatively short period of time in which each patron is in the interrogation corridor, and the fact that multiple patrons can be in the interrogation corridor at the same time. The present techniques described below enable this in several ways. First, RF reader 20 does not necessarily require receipt of a full tag serial number for each tag in the corridor in order to determine the status of the tag. For example, in some embodiments, all of the checked-in tags in the corridor may respond at the same time. In other words, the techniques do not necessarily require that each tag in the corridor respond in a separate time slot so that each tag can be individually identified. In fact, in some embodiments, there is no need to even individually identify each tag in the corridor to determine the status of the tags. In some embodiments described below, the transmission of a complete, single communication frame is not required.

Figure 6:
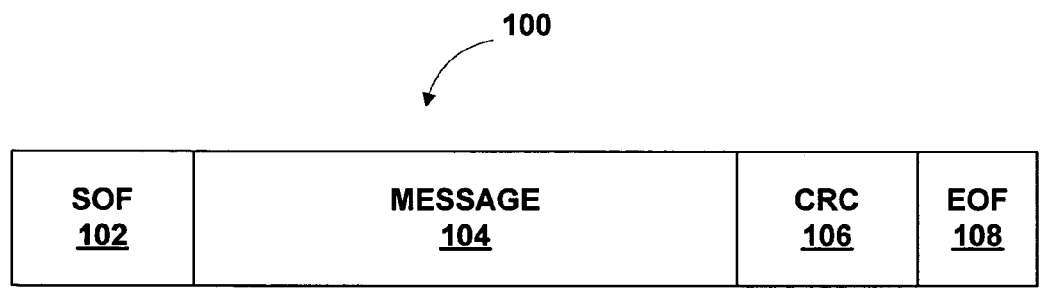
FIG. 6 shows the frame format for communication between an RF reader and RF tags.

RF reader 20 and the RF tags communicate using a known protocol in which each message is embedded within one or more frames of a predefined format. The format of an example RFID transmission frame 100 is shown in FIG. 6. The frame 100 includes a start of frame (SOF) 102, a message 104, cyclical redundancy check (CRC) 106 and end of file (EOF) 108. SOF 102 indicates the beginning of the frame. Similarly, EOF 108 indicates that the entire frame has been transmitted. Any non-fixed data is embedded in the message 104 portion of the frame 100 and CRC 106 reflects the data in the message 104.

CRC 106 is used to check the integrity of the data. To calculate CRC 106, all bits of the data are pushed through a predetermined algorithm. Once the frame is transmitted, the receiver decodes CRC 106 using the received data to determine whether the message 104 was properly transmitted. If the CRC generated from the received data does not match the CRC contained within the frame itself, an error occurred.

One aspect of the presently described techniques is directed to ensuring that only tags that are not checked-out (i.e., still checked-in) respond when passing through the interrogation corridor. This can be accomplished by making use of a feature called the Application Family Identifier (AFI) byte. This feature is described in the ISO 15693 standard for RFID systems. The AFI byte is a piece of memory in the RFID tag that contains one 8-bit value. The AFI is normally used to identify the type of article to which the tag is attached, such as book, CD, videotape, etc. The value stored in the AFI location can be changed through a defined series of commands described in the ISO 15693 standard. When the RF reader issues an AFI command it sends an AFI value. As defined in the ISO 15693 standard, when the AFI value transmitted in a command is 0×00 (hexadecimal) then all tags in the interrogation field respond. When the RF reader transmits any value other than 0×00, then only tags with a matching AFI value in memory respond to the command.

The techniques described herein use the AFI byte to indicate the status of the article, for example, whether the article has been checked-out. The AFI field is therefore used as a checked-in/checked-out status byte. When books or other articles are on the shelf the AFI byte is set to a designated "checked-in" value. When a librarian checks out the book or a patron checks out at a self check station the AFI value is changed to a different, "checked-out" value.

The RF reader scans for tags containing the checked-in value in their AFI memory location. This will cause all tags with their AFI byte set to "checked-in" to respond. If the RF reader receives a response from the tags then the item was not properly checked-out. This is because any item that was properly checked-out would not have the checked-in value in their AFI byte and would not respond.

An example of how the present technique of using the AFI byte as a checked-in/checked-out status byte will now be described. A patron returns an item to an automatic book drop. The book drop reads the serial number and sets the AFI byte to "checked-in". The item is returned to the shelf and then another patron decides to leave with the item. The new patron inadvertently leaves without checking-out the book. The patron walks through the interrogation corridor, which is looking for tags having the "checked-in" value. When the system sees the checked-in tag in the corridor, the system will alarm.

If instead the patron properly checks-out the item, the AFI byte is set to "checked-out". When the patron passes through the corridor, the tag will not respond to the system's command because the system asks only checked-in tags to respond. The patron can thus walk through the corridor and remove the article without alarm.

A second technique described herein is directed at verifying that the received tag communication is actually a tag-produced response and not noise-produced. Namely, in one embodiment, the system asks all tags in the interrogation field to respond at the same time. Under normal circumstances this would only be done in a situation where one tag was present in the field at a time. When two or more tags respond in the same timeslot it creates a situation called a "collision". Normally when a collision occurs, no message 104 of the responding tags can be heard properly. In many systems, a process called anti-collision is implemented and tags are commanded to respond in different timeslots until all tags are identified. However, this process typically consumes too much time in exit control applications, in which tags pass quickly through the corridor.

Instead, the techniques described herein ask all tags to respond in the same time slot knowing that collisions will occur if more than one unchecked-out (checked-in) tag is present in the corridor. This embodiment makes use of the fact that the SOF is one piece of information that can still be validly received even when collisions occur. The SOF is the first transmission sent by tags responding to a command. Regardless of how many tags respond to the command they will all respond with the same SOF at the same time. By detecting the SOF, the system validates that at least one checked-in tag is actually in the interrogation field.

Figure 7:
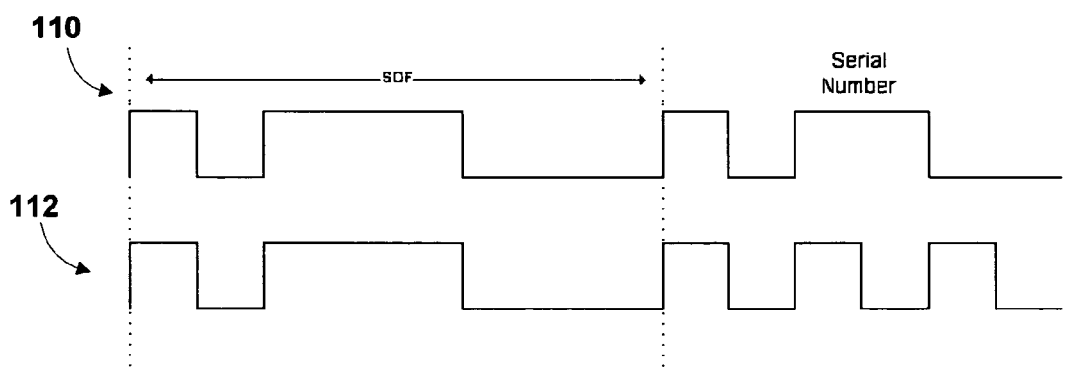
FIG. 7 shows two example tag signals.

FIG. 7 shows an example of two tag signals, a first tag signal 110 and a second tag signal 112. Both signals 110 and 112 transmit the same SOF, but have different data in the message fields. Since both tags are responding at the same time and the data is combined by the splitter/combiner going back into RF reader, the data in the message field received by the RF reader is subject to a collision. The SOF, however, does not collide irrespective of how many tags are in the field.

Figure 8:
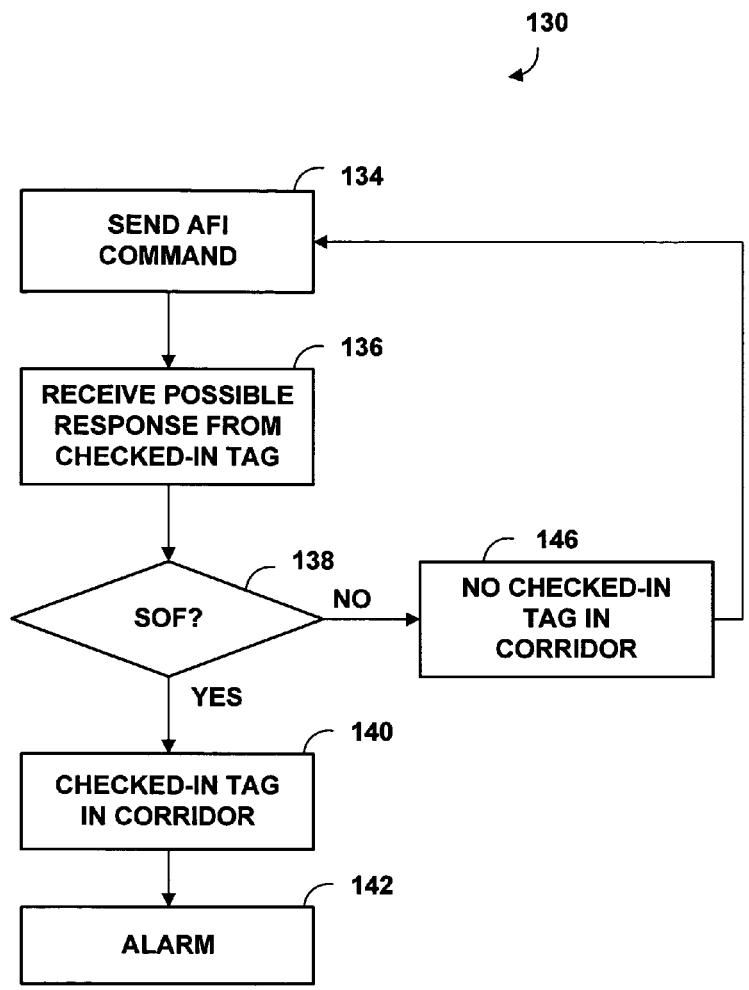
FIG. 8 shows a flowchart of one embodiment of a method employed by the RF reader to determine presence of a checked-in tag in the interrogation corridor.

FIG. 8 is a flowchart 130 of the present technique for verifying presence of an unchecked tag in an interrogation corridor using the AFI byte as a status byte and the SOF as verification that an unchecked tag is in the field. First, the RF reader sends the AFI command with the AFI value set to checked-in (134). Each tag with a matching checked-in AFI byte responds, and the possible checked-in tag response is received (136). Next, to verify that the response is an actual tag response and was not created by noise, the system checks for the SOF (138). If a valid SOF was received, at least one checked-in tag is present in the interrogation corridor (140) and the alarm is activated (142). The alarm is activated for a predetermined duration. On the other hand, if a valid SOF is not received, the system assumes that noise caused the response, and that therefore there is not a checked-in tag in the corridor (146). The loop then restarts by sending an AFI command (134).

Figure 9:
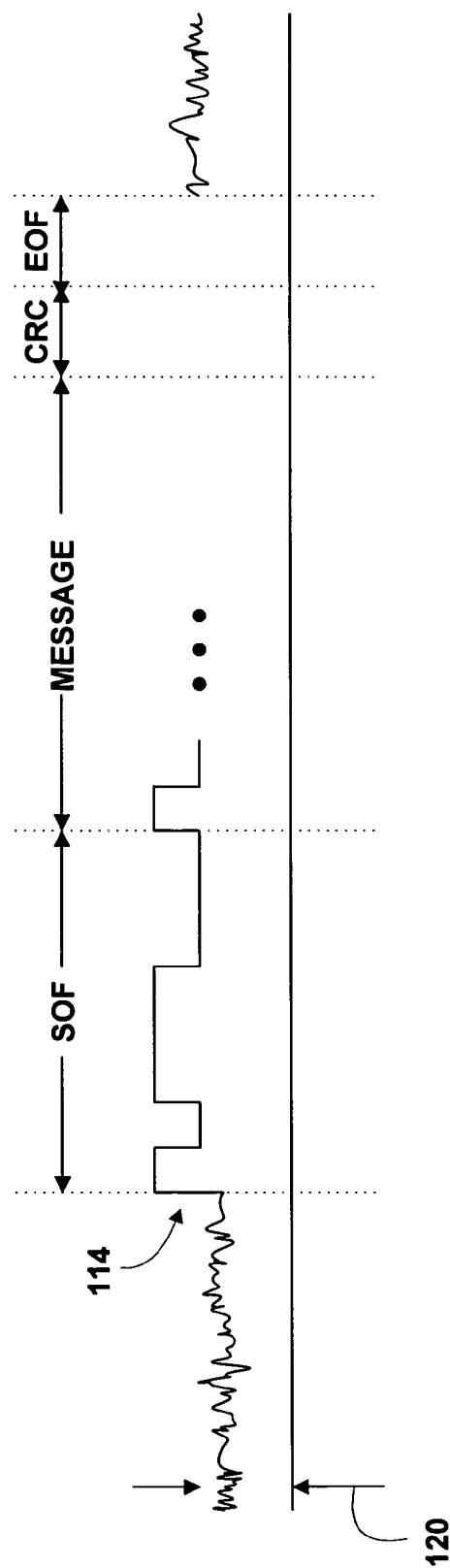
FIG. 9 shows an example tag signal in the presence of noise.

In other embodiments techniques to ensure the validity of the SOF are used. In particular, a received signal strength indicator is used to separate actual tag-produced responses from noise-produced responses. FIG. 9 shows an example of tag signal frame in the presence of noise. The tag signal 114 is shown on top of a noise floor 120. This noise floor is measured and analyzed as described below to verify a valid SOF.

Figure 10:
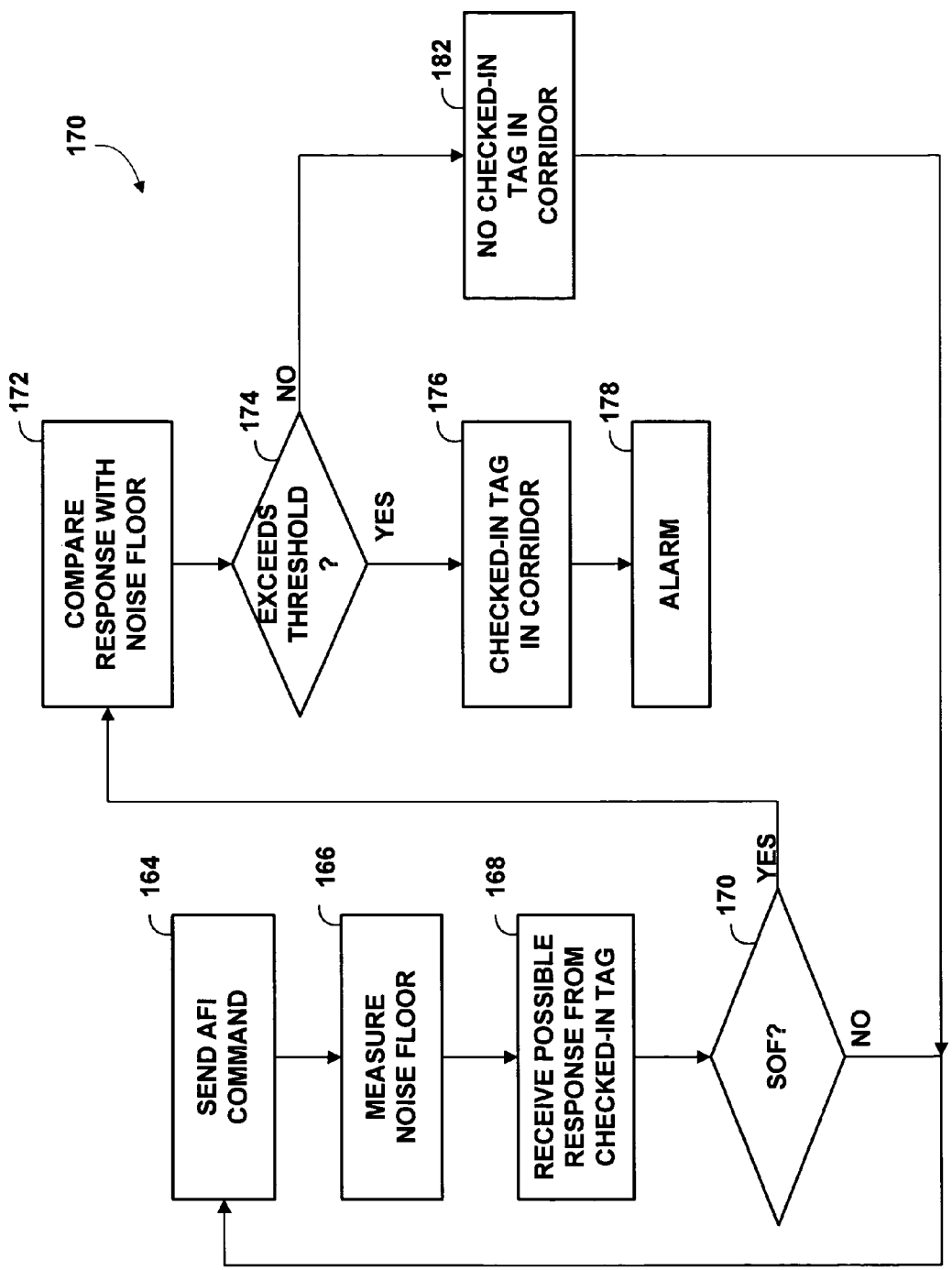
FIG. 10 shows another embodiment of a method employed by the RF reader to determine presence of a checked-in tag in the interrogation corridor.

FIG. 10 is a flowchart 170 showing this technique. FIG. 10 is similar to FIG. 8 in that the AFI byte is used as a checked-in/checked-out status byte and the SOF is used to validate a tag-produced signal. In addition, the flowchart of FIG. 10 uses a received signal strength technique to validate the SOF. First, the AFI command is sent with the AFI byte set to checked-in (166). Then, the noise floor of the corridor is measured (164) prior to any tag response. Any tag with AFI byte set to checked-in will respond to the command, the response is received and the signal strength is measured (168). The system next checks for the SOF (170). If a SOF is detected, the response signal strength is compared with the noise floor (172). This is because although receipt of an SOF is an indication that a tag is in the field, since the SOF is only 8-bits long noise can sometimes produce an SOF sequence. If the differential between the response signal strength and the noise floor is adequate to indicate that the signal is authentic (174), the system validates that a checked-in tag is present in the interrogation field (176). The system then alarms (178). On the other hand, if the differential is not adequate (174), the system assumes that noise created the response and that therefore there is no checked-in tag in the corridor (182). The loop is then restarted.

Figure 11A:
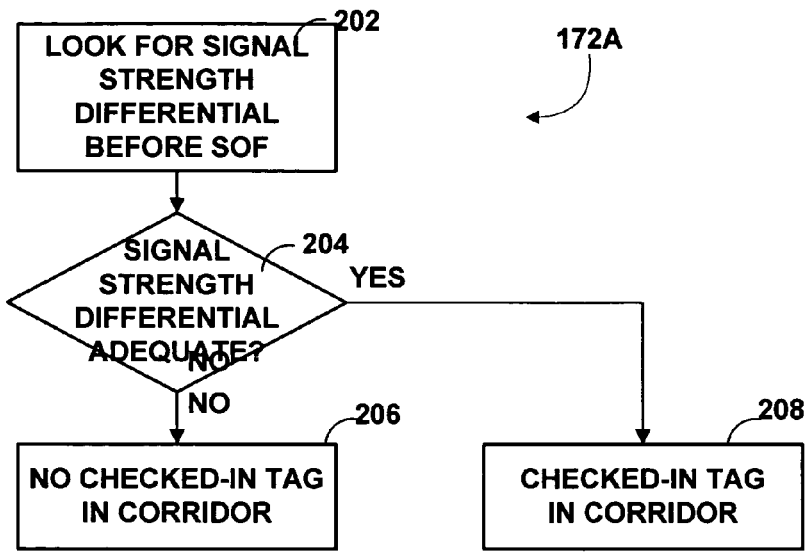
FIGS. 11A and 11B show alternate embodiments of the signal strength indicator algorithm.
Figure 11B:
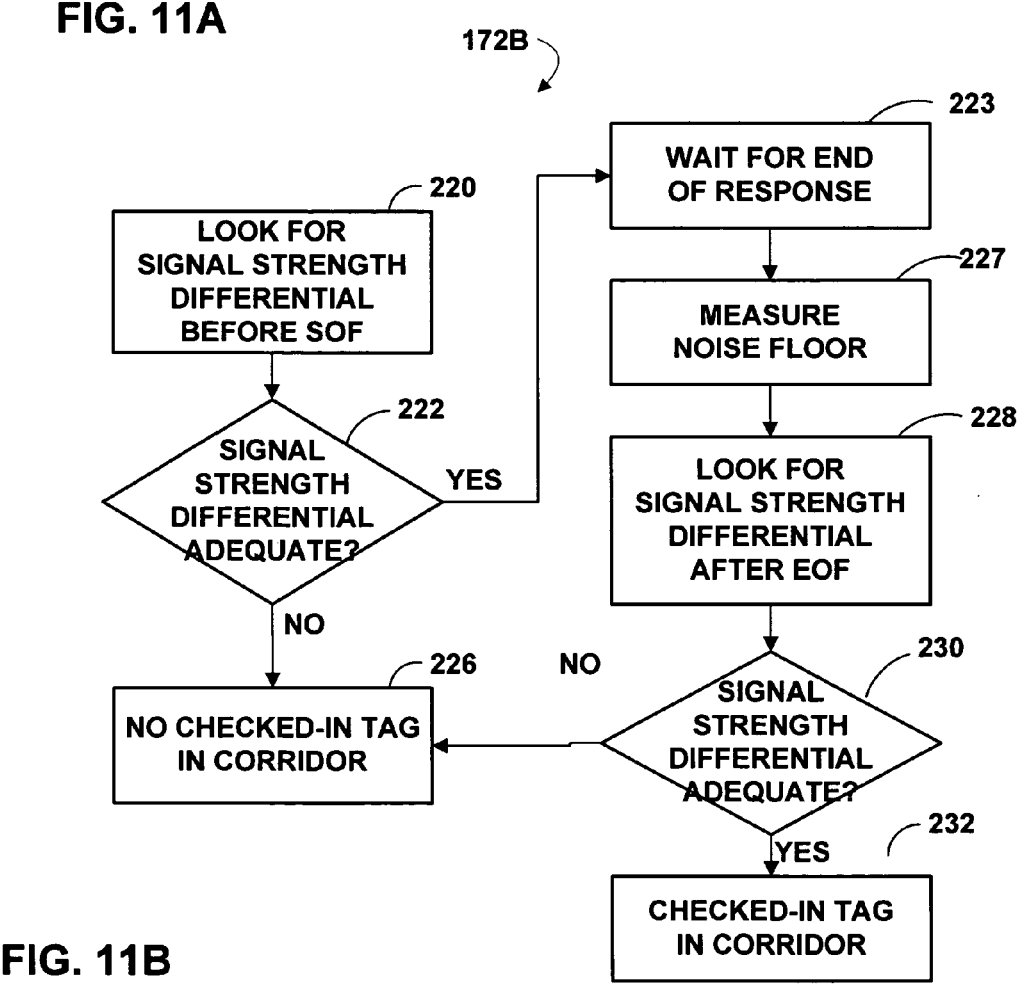

FIGS. 11A and 11B show two embodiments of the method for comparing the possible received tag response with the noise floor (172 in FIG. 10). In FIG. 11A, method 172A first looks for a difference between the measured noise floor and the measured signal strength, the signal strength measurement occurring during the time of the signal response period, that is adequate to indicate that the received signal is authentic (202). If the signal strength differential is adequate to indicate that the signal is authentic (204), the RF reader indicates that an unchecked-out (i.e., checked-in) tag is present in the corridor (208). If the signal strength differential is not adequate to indicate that the received signal is authentic, the RF reader assumes that noise produced the response and that therefore no checked-in tags are present in the corridor (206).

In FIG. 11B, the method not only looks at the noise floor before the SOF, but also after the end of the expected tag response. Checking the noise floor after the EOF is received is one more verification that the response was really a tag-produced response and not a noise-produced response. The method 172B first looks for a differential between the noise floor measured prior to the SOF and the signal strength (220). If the differential is not adequate to indicate that the signal is authentic (222), the system assumes a noise-produced response and signals that no checked-in tags are present in the corridor (226). If the differential is adequate, (222), the system next looks for a differential between the signal strength and the noise floor measured after the EOF of the expected tag response (228). If this differential is also adequate (230), the system signals that a checked-in tag is present in the corridor (232).

The techniques described in FIGS. 10 and 11 may have several advantages. By having all the tags respond in the same time slot, the amount of time required to determine whether a checked-in tag is present in the interrogation field is significantly reduced. The minimum scan time is reduced from around 60 ms to around 20 ms. In addition, when all the checked-in tags respond at the same time, the likelihood of detecting a checked-in tag is increased because the signals are combined going back into the RF receiver. Also, since the system only looks for the SOF, the whole tag transmission need not be heard to determine whether or not it is checked-in. This can occur when a tag moves into a weaker portion of the interrogation field and loses power half way through the transmission. In this way, the system can reliably alarm even if a tag only has enough power to transmit part of its serial number. In fact, the checked-in tag need only transmit its SOF for the system to detect its presence. Furthermore, the system is not compromised when multiple tags respond at the same time. In fact, the system is designed so that this is the case. Multiple tag responses occurring at the same time actually increase the likelihood that a checked-in tag will be detected.

The signal strength indicator can be implemented using a variety of embodiments. In one embodiment, the signal strength indicator is generated by a circuit, and provides an indication of the strength of the received signal. This information is amplified and sent to the controller (reference numeral 14 in FIG. 2). The controller 14 uses an analog-to-digital converter to analyze the signal as described above with respect to FIGS. 11A and 11B.

Figure 12:
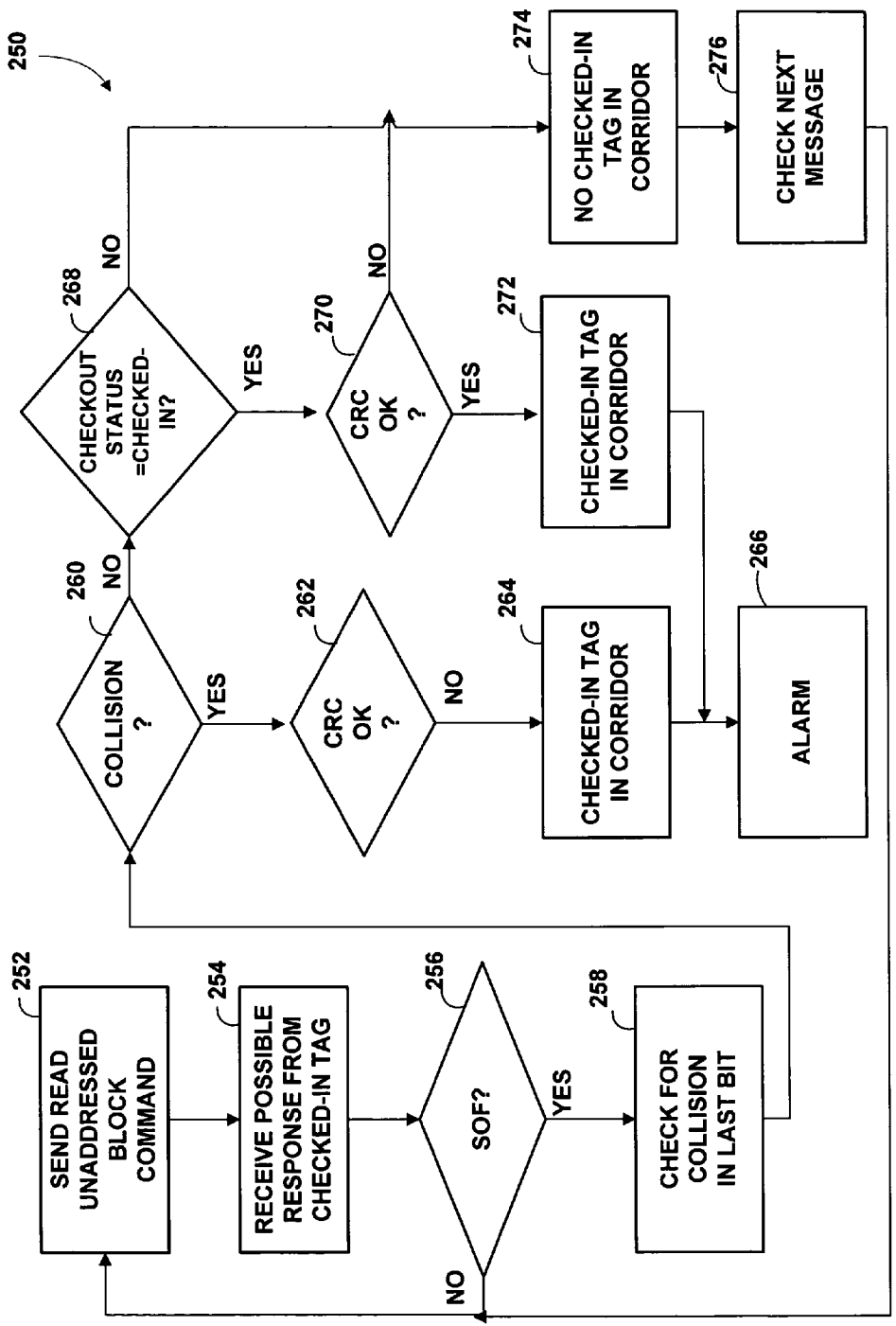
FIG. 12 shows another embodiment of a method employed by the RF reader to determine presence of a checked-in tag in the interrogation corridor.

FIG. 12 shows another embodiment of a method by which the RF reader may determine whether a checked-in tag is present in the interrogation corridor. This process (250) is used with the "Tag-it" type tags available from Texas Instruments as mentioned above. There is a command in the Tag-it protocol where all tags in the interrogation field respond with the data stored in an defined block and they will all respond at the same time. The present technique sets one block of data in the tag as the "check-out status block." The command is then used to determine whether at least one unchecked-out (checked-in) tag is in the field.

For example, assume the check-out status block in a checked out book is set to:
00000001
and the data in a checked-in book is set to:
00000000.

As tags move through the interrogation field, the "read unaddressed block" command is sent by the RF reader. Every tag in the field will respond at the same time. As the tags respond the RF reader will receive the SOF as described above. The check-out status block for each tag will be identical except for the last bit and the CRC if both checked-out and checked-in tags are present. The present method checks for collisions on the last bit of the check-out status block and the CRC to determine whether at least one checked-in tag is present in the interrogation field. For example, the following table shows the possibilities that may occur, where "clear" indicates no collision was detected.

| | | |
|---|---|---|
| All checked-out books | SOF - clear<br>Checked-out status - clear<br>CRC - clear | No alarm |
| All checked-in books | SOF - clear<br>Checked-out status - clear<br>CRC - clear | Alarm |
| Both checked-out and Checked-in books | SOF - clear<br>Checked-out status - collision on last bit<br>CRC - collisions | Alarm |

In reference to FIG. 12, the RF reader sends the "read unaddressed block" command (252). The possible tag response is received (254). The system checks for SOF using the techniques described above with respect to FIGS. 8, 10 and/or 11. If the SOF is not detected (256), the reader continues checking (252). If an SOF was detected, the system checks for a collision on the last bit of the checked-out status byte (258). If a collision is detected (260) the reader next checks the CRC (262). If a collision is detected in the CRC the system signals that at least one checked-in tag is in the corridor (264) and activates the alarm (266). This is the situation shown in row three of the Table discussed above.

If no collision occurred in the checked-out status bit (260) the reader determines whether the checked-out status bit is set to checked-in (268). If so, the reader checks for collisions in the CRC (270). If there are no collisions, then all of the tags in the corridor are checked-in tags (272) and the controller activates the alarm (266). This is the situation shown in row two of the Table shown above.

If no collision occurred in the checked-out status bit (260) and the checked out status bit is not checked-in, then the books must be checked-out, there are no checked-in tags in the corridor (274) and the next response is checked (276). This is the situation shown in row one of the Table shown above.

Figure 13:
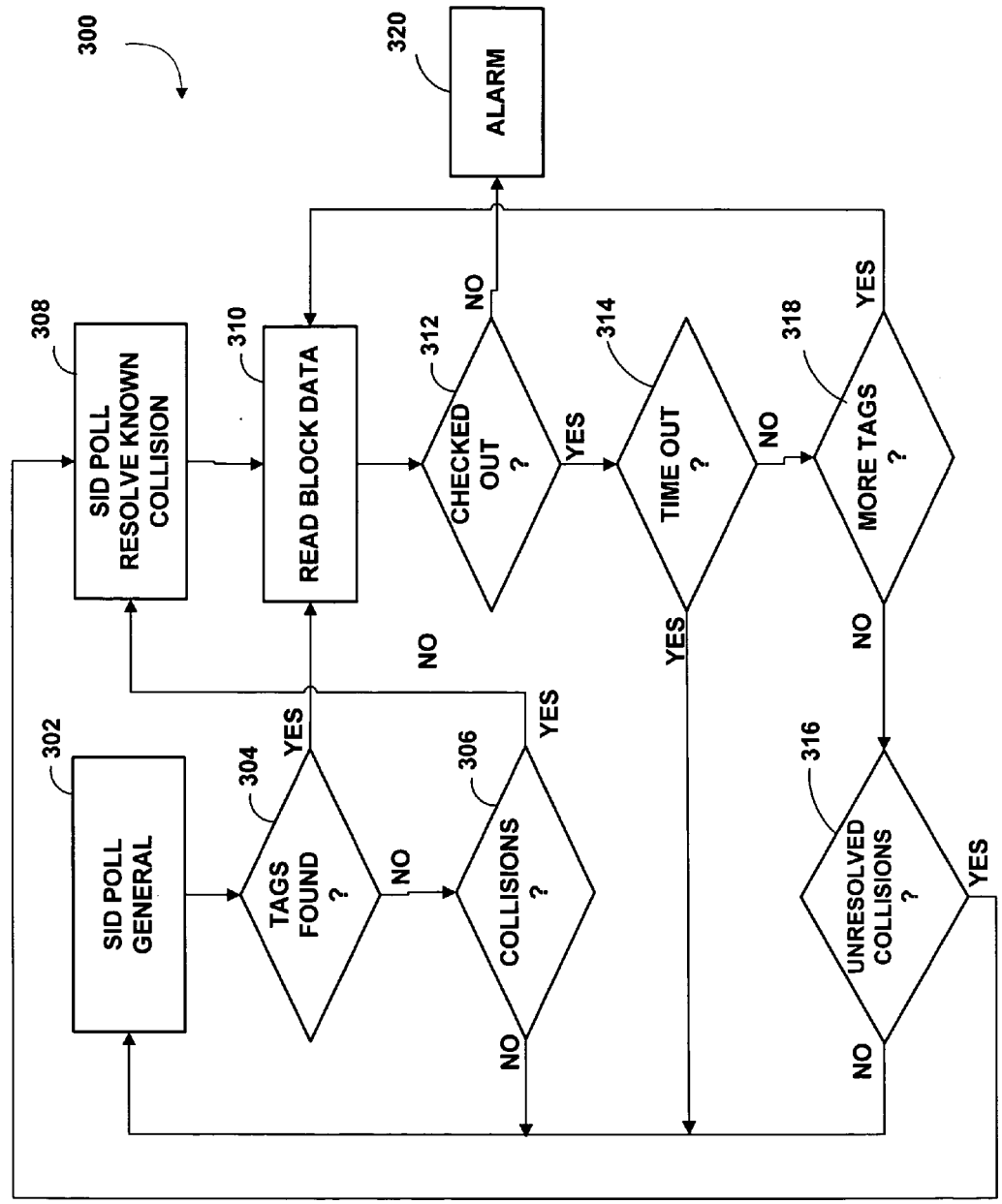
FIG. 13 shows another embodiment of a method employed by the RF reader to determine presence of a checked-in tag in the interrogation corridor.

Other embodiments may also be used to determine presence of a checked-in tag in the interrogation corridor. One of these embodiments is shown in FIG. 13. The flowchart may depict an algorithm that runs continuously in the RF reader. When the RF reader indicates an alarm (320) a message is sent to the controller notifying that a checked-in book has passed through the interrogation corridor. This algorithm shown in FIG. 13 ignores collisions and overpowered tags during the first sweep for tags. The algorithm concentrates on reading as many tags as possible as quickly as possible.

The algorithm shown in FIG. 13 allows the current TI "Tag-it" and TI ISO 15693-3 tags to be used in an exit control system without significant degradation of performance. One conventional way to determine whether the TI-type tags are checked-in is to run a SID (Simultaneous IDentification) Poll on all tags in the field and then read from the specific block where the checked-in/checked-out code is kept. One potential problem with this technique is that the SID Poll will continue until all collisions are resolved (when multiple tags talk at the same time) and if one tag leaves the field during this algorithm, then the process halts and no data is returned. This could very easily happen in a detection environment where tags are constantly moving into and leaving the field—patrons walking through the exit control system with books (which have tags).

The algorithm shown in FIG. 13 uses a modified SID poll (302) and tries to resolve as many tags as possible as quickly as possible the first time through the algorithm (304 and 310). If a tag with a set checked-in code is found (312), the alarm is triggered (320). If there is still time remaining (304) (the tags are still in the field), then the algorithm will attempt to resolve as many collisions as possible (308). Because it only issues the unmasked SID poll and ignores collisions unless there is enough time to resolve them, the speed with which the algorithm can identify unchecked-out tags in the field is increased.

The statistics for this method are described below. The first set of numbers given in parentheses are examples of least significant digits of the SID code. This is based on the 16 timeslot SID algorithm. The second set of numbers in parenthesis is the number of tags validated after the first pass.

0 Tags 100.00%
1 Tag 100.00%
2 Tags: $15/16$ chance of reading 93.75%
3 Tags: No Collisions (012) $210/256$ chance (82.03%) One Collision (011) $45/256$ chance (17.57%) Two Collisions (111) $1/256$ chance (0.39%)

Overall Chance:
No Collisions+$1/3$*One Collision+0*Two Collisions 87.89%
4 Tags: No Collisions (0123) $2730/4096$ chance (66.65%) One Collision (0012) $1260/4096$ chance (30.76%) Two Collisions (0001) $60/4096$ chance (1.46%) Double Collision (0011) $45/4096$ chance (1.10%) Three Collisions (0000) $1/4096$ chance (0.02%)

Overall Chance:
No+$1/2$ One+$1/4$ Two+0 Double+0 Three 82.31%
5 Tags: No Collisions (01234) $32760/65536$ (49.99%) One Collision (00123) $27300/65536$ (41.66%) Two Collisions (00012) $2145/65536$ (3.27%) Three Collisions (00001) $1290/65536$ (1.97%) Four Collisions (00000) $1/65536$ (0.00%) Two/Two (00122) $1890/65536$ (2.88%) Two/Three (00111) $150/65536$ (0.22%)

Overall Chance:
No+$3/5$ One+$2/5$ Two+$1/5$ Three+$1/5$2-2 77.26%

It shall be noted that with 3 tags, if there are no collisions, all tags will be verified. If there is one collision, the colliding tags will not be read, but the one tag which does not match will be read, and since this is one of the three possible tags, a factor of $1/3$ is used to multiply by the percentage chance of having one collision. This logic is continued throughout the other 4 and 5 tag statistics. It shall also be understood that these percentages are only for the first pass, and the other tags will be resolved on subsequent passes, time and location of the tags permitting.

Figure 14:
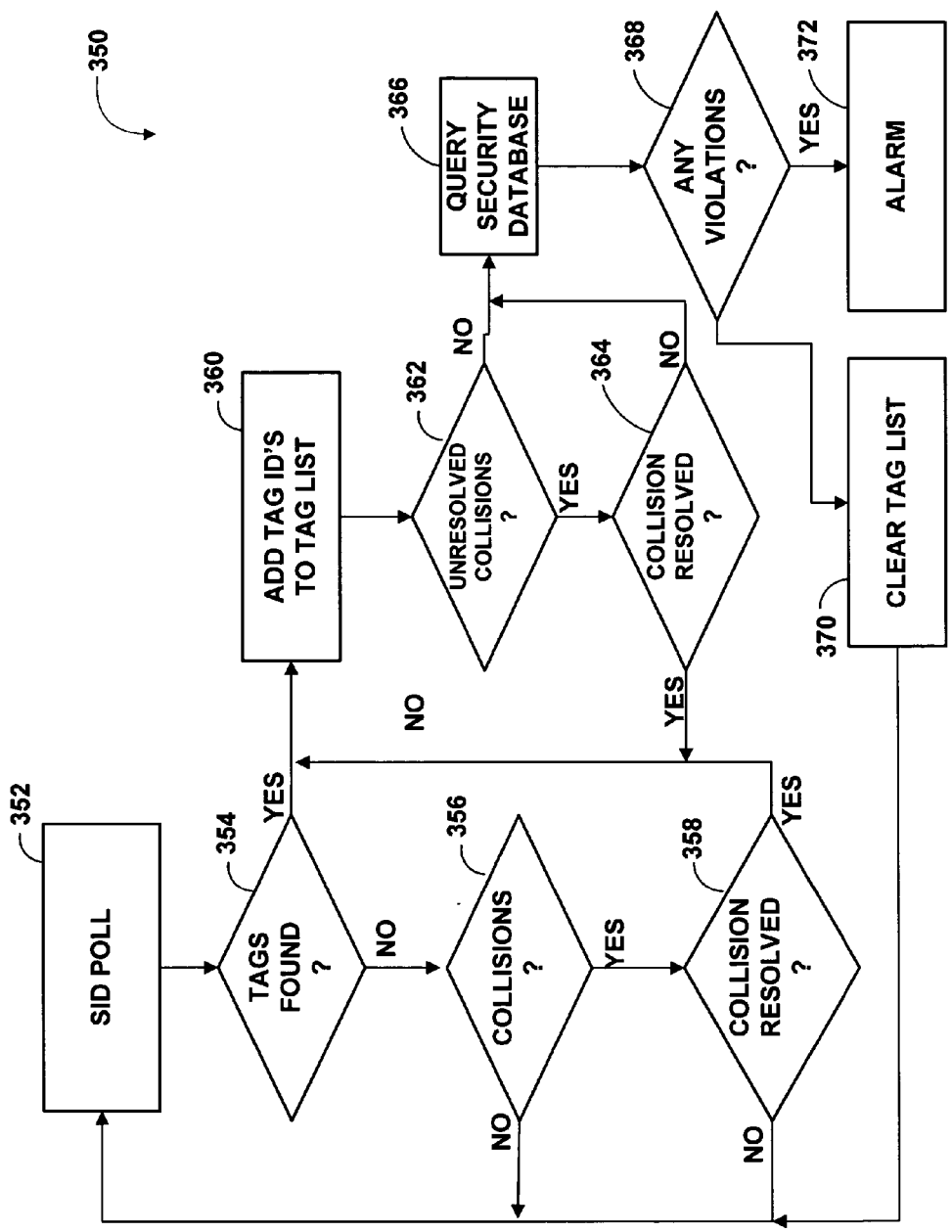
FIG. 14 shows embodiment of a method employed by the RF reader to determine presence of a checked-in tag in the interrogation corridor.

Another embodiment of the checked-in tag detection is shown in FIG. 14. The algorithm refers to a database containing tag ID's of properly checked out items. This database that may reside on the exit control system itself, but the invention is not limited in this way.

First, an SIF poll is performed on the tags in the interrogation corridor (352). When tags are detected in the interrogation fields (354), the algorithm only gathers the tag ID's that can be resolved before the tags leave the interrogation corridor (360). The amount of time before a tag leaves the interrogation corridor could either be determined as an average calculated value based upon expected speed through the portal or be dynamically determined by the inventory of tags being collected.

An additional poll of tags could also be required after each collision is resolved. If this poll doesn't get a least one duplicate tag ID as that was obtained in the initial poll, the determination could be that a new set of tags has entered the interrogation corridor. This would trigger the database query for the previous set of tags.

Another possible strategy would be to infer that the tag has left the corridor as soon as the current collision cannot be resolved. This also would trigger the database query.

The algorithm shown in FIG. 14 thus specifically focuses on collecting as many tag ID's as possible and does not check for security information until the above mentioned time is expired. At that time, a query is made to the database to determine if all the detected tags exist in the security database.

The advantages provided by the embodiment of FIG. 14 are related to the effects of non-uniform fields, as well as the amount of time available for tag detection. This algorithm provides a means of maximizing the number of tags to sample for security. This algorithm is not affected as significantly by non-uniform fields because once the tag ID is collected, the system no longer needs to communicate with the tag for security information.

The following discussion is directed toward a method for use with the new Electronic Product Code (EPC). The EPC is set to supplant the Universal Product Code (UPC) in certain applications by using RFID for item identification. Within this new specification is a "destroy" command that when executed renders the RFID tag destroyed or nonfunctional. The method creates a "key" for this destroy command which is difficult to detect as well as secure so that malicious use of the destroy command will not affect performance of the RFID tag.

The destroy command renders the RFID tag nonfunctional. To set the destroy code, a proper command is given to the chip and the memory is programmed. To execute the destroy command, the password which was placed in the destroy memory location must be sent again to the chip, and if there is a match then the chip is destroyed.

The present method creates a secure "key" for the destruction of RFID tags. If one key was used for all tags at all locations, if someone were to break the key, they could in theory destroy all RFID at that location. For example:

|  | Tag A | Tag B | Tag C |
|---|---|---|---|
| Destroy Code: | G | G | G |

The same code in the destroy register yields a possibility of compromising all tags in an installation.

With the present method, however, the EPC identification code (up to 88 bits of information) is run through an algorithm and further placed into the destroy memory register (24 bits). This would make every destroy command unique to each tag, and would make a unique key that is difficult to decipher. For example:

|               | Tag A | Tag B | Tag C |
|---------------|-------|-------|-------|
| Destroy Code: | U     | W     | L     |

An algorithm "key" is common to all tags and destroy codes, but because the destroy code cannot be read from the tags, the presently described method makes it much more difficult to break the algorithm, thus maintaining the overall security of the site.

| Example EPC Identification: | 00000000 | 00 hex |
|---|---|---|
|   | 11111111 | FF |
|   | 00000000 | 00 |
|   | 11111111 | FF |
|   | 00000000 | 00 |
|   | 11111111 | FF |
|   | 00000000 | 00 |
|   | 11111111 | FF |
|   | 00000000 | 00 |
|   | 11111111 | FF |
|   | 00000000 | 00 |

88 bits organized into 11 blocks of 8 bits.

An example algorithm may, for example, select some memory, perform a function (add, subtract, multiply, with data or constants, etc.) and create an output destroy command.

| Destroy command | 10001101 | 8D |
|---|---|---|
| (random for this example) | 01111011 | 7B |
|   | 00010110 | 16 |

Another EPC value with this algorithm run would create an entirely different destroy command value.

Between sites, a different algorithm could be used to discern different stores or vendors such that the different algorithm would not allow the tags to be destroyed. In a shipping security example, only articles sold to one retailer to could be sold by that same retailer. Between two stores with different algorithms, the identical EPC value would yield a different destroy command code.

Various embodiments of the invention have been described. These and other embodiments are within the scope of the following claims.

The invention claimed is:

1. A system, comprising:
   a plurality of radio frequency (RF) antennas set up to provide one or more interrogation corridors;
   a RF reader coupled to the plurality of antennas, the RF reader having a single transmitter/receiver (T/R) port that provides each of the antennas with RF power to produce interrogation fields within the interrogation corridors and delivers a combined input signal to the RF reader, wherein the RF reader generates a tag detection signal to indicate that at least one tag is present within the interrogation corridors;
   a splitter that receives the RF power from the RF reader and delivers the RF power to each of the plurality of antennas in the form of a plurality of antenna drive signals, wherein the splitter receives one or more input signals from the plurality of antennas and combines the one or more tag signals to form the combined input signal;
   a plurality of sensors to detect a patron within any of the interrogation corridors and generate a patron signal; and
   a controller that outputs an alarm signal upon receiving the tag detection signal and the patron signal within a time period.

2. The system of claim 1, wherein the plurality of antennas generate the input signals in response to at least one tag present within the interrogation fields.

3. The system of claim 1 wherein the splitter combines the input signals such that a weak input signal from one of the antennas is combined with a weak input signal from at least one other antenna to increase the likelihood of detecting a tag in the corridor.

4. The system of claim 1, wherein the interrogation corridors are located near the exit of a protected area.

5. The system of claim 1, wherein the controller initiates a timer upon receiving either of the tag detection signal or the patron signal, and outputs the alarm signal prior to expiration of the timer upon receiving the other one of the tag detection signal or the patron signal.

6. The system of claim 1 wherein each antenna receives RF power from the reader that is out of phase with its neighboring antennas to produce rotating interrogation fields within the interrogation corridor.

7. A system, comprising:
   a plurality of radio frequency (RF) antennas set up to provide one or more interrogation corridors;
   an RF reader coupled to the plurality of antennas, the RF reader having a single transmitter/receiver (T/R) port that provides each of the antennas with RF power to produce interrogation fields within the interrogation corridors and delivers a combined input signal to the RF reader; and
   a splitter that receives the RF power from the RF reader and delivers the RF power to each of the plurality of antennas in the form of a plurality of antenna drive signals, wherein the splitter receives one or more input signals from the plurality of antennas and combines the one or more tag signals to form the combined input signal,
   wherein the RF power delivered to each of the antennas has a 90° phase difference from the RF power delivered to a neighboring one of the antennas, and
   wherein the 90° phase difference is provided using ¼ wavelength transmission lines.

8. The system of claim 1 wherein the T/R port simultaneously provides each of the antennas with the RF power and accepts a signal produced by an RF tag in any of the interrogation corridors.

9. A method, comprising:
   producing a radio frequency (RF) output signal from a single transmitter/receiver (T/R) port of an RF reader;
   splitting the RF output signal using a splitter into a plurality of antenna drive signals;
   delivering the antenna drive signals to a plurality of antennas to produce interrogation fields within one or more interrogation corridors;
   generating one or more input signals with the antennas in response to at least one tag present within the interrogation fields;
   combining the input signals into a combined input signal using the splitter;

providing the combined input signal to the T/R port of the RF reader;

outputting the tag detection signal from the RF reader to a controller;

receiving a patron signal that indicates whether a patron is present within any of the interrogation corridors; and outputting the alarm signal upon receiving the tag detection signal and the patron signal within a time period.

10. The method of claim 9, further comprising:

receiving the combined input signal with the T/R port; and generating a tag detection signal from the combined input signal to indicate that at least one tag is present within the interrogation corridors.

11. The method of claim 10, further comprising producing rotating interrogating fields in the interrogation corridor.

12. The method of claim 9, further comprising:

initiating a timer upon receiving either of the tag detection signal or the patron signal; and outputting the alarm signal prior to expiration of the timer upon receiving the other one of the tag detection signal or the patron signal.

13. The method of claim 9, further comprising delivering the plurality of antenna drive signals to the plurality of antennas such that adjacent antennas are driven out of phase.

14. The method of claim 9, further comprising delivering the plurality of antenna drive signals to the plurality of antennas-such that adjacent antennas are driven 90° out of phase.

15. A method comprising:

producing a radio frequency (RF) output signal from a single transmitter/receiver (T/R) port of an RF reader;

splitting the RF output signal using a splitter into a plurality of antenna drive signals;

delivering the antenna drive signals to a plurality of antennas to produce interrogation fields within one or more interrogation corridors;

generating one or more input signals with the antennas in response to at least one tag present within the interrogation fields;

combining the input signals into a combined input signal using the splitter;

providing the combined input signal to the T/R port of the RF reader; and delivering the plurality of antenna drive signals to the plurality of antennas using ¼ wavelength transmission lines such that adjacent antennas are driven 90° out of phase.

16. An exit control system for detecting unauthorized removal of articles from a protected area, the exit control system comprising:

a plurality of antennas oriented to provide interrogation corridors;

an RF reader coupled to the plurality of antennas, the RF reader having a single transmitter/receiver (T/R) port that provides RF power to the antennas to produce interrogation fields in the interrogation corridors and delivers a combined input signal to the RF reader, wherein the RF reader interrogates the plurality of antennas using the single T/R port to transmit RF power to the antennas and to receive tag signals from the antennas at the single T/R port, wherein the reader generates a tag detection signal to indicate that at least one tag is present within the interrogation corridors;

a splitter that receives the RF power from the RF reader and delivers the RF power to each of the plurality of antennas in the form of a plurality of antenna drive signals, wherein the splitter receives one or more input signals from the plurality of antennas and combines the one or more tag signals to form the combined input signal;

a plurality of sensors to detect a patron within any of the interrogation corridors and generate a patron signal; and a controller that outputs an alarm signal upon receiving the tag detection signal and the patron signal within a time period.

17. A computer-readable medium comprising instructions that cause a processor to:

output RF power from a reader using a splitter to a plurality of antennas through a single transmitter/receiver (T/R) port to produce interrogation fields within a plurality of interrogation corridors;

receive from the splitter via the T/R port a combined tag detection signal that indicates at least one tag is present within any of the plurality of interrogation corridors;

receive a patron signal that indicates at least one patron is present within any of the interrogation corridors;

initiate a timer upon receiving either of the tag detection signal or the patron signal; and output an alarm signal upon receiving the tag detection signal and the patron signal prior to expiration of the timer.

* * * * *

UNITED STATES PATENT AND TRADEMARK OFFICE
CERTIFICATE OF CORRECTION

| | | |
|---|---|---|
| PATENT NO. | : 7,119,692 B2 | Page 1 of 1 |
| APPLICATION NO. | : 10/705677 | |
| DATED | : October 10, 2006 | |
| INVENTOR(S) | : Seth A. Lieffort | |

It is certified that error appears in the above-identified patent and that said Letters Patent is hereby corrected as shown below:

Column 15,
Line 29, delete "multiply," and insert -- multiply --.

Column 17,
Line 7, delete "outputting the" and insert -- outputting an --.

Signed and Sealed this

Eighteenth Day of September, 2007

JON W. DUDAS
*Director of the United States Patent and Trademark Office*